(12) United States Patent
Auyeung et al.

(10) Patent No.: US 11,236,182 B2
(45) Date of Patent: Feb. 1, 2022

(54) ZIEGLER-NATTA CATALYST DEACTIVATION AND NEUTRALIZATION

(71) Applicant: Dow Global Technologies LLC, Midland, MI (US)

(72) Inventors: Evelyn Auyeung, Lake Jackson, TX (US); Sean W. Ewart, Lake Jackson, TX (US); Daniela Ferrari, Freeport, TX (US); Thomas Davidian, Terneuzen (NL); Rony Vanspeybroeck, Terneuzen (NL)

(73) Assignee: Dow Global Technologies LLC, Midland, MI (US)

( * ) Notice: Subject to any disclaimer, the term of this patent is extended or adjusted under 35 U.S.C. 154(b) by 0 days.

(21) Appl. No.: 16/977,287

(22) PCT Filed: Mar. 25, 2019

(86) PCT No.: PCT/US2019/023809
§ 371 (c)(1),
(2) Date: Sep. 1, 2020

(87) PCT Pub. No.: WO2019/190949
PCT Pub. Date: Oct. 3, 2019

(65) Prior Publication Data
US 2021/0002393 A1 Jan. 7, 2021

Related U.S. Application Data

(60) Provisional application No. 62/649,205, filed on Mar. 28, 2018.

(51) Int. Cl.
*C08F 10/02* (2006.01)
*C08F 2/06* (2006.01)
(Continued)

(52) U.S. Cl.
CPC ............. *C08F 10/02* (2013.01); *C08F 2/06* (2013.01); *C08F 2/42* (2013.01); *C08F 6/02* (2013.01); *C08F 110/14* (2013.01)

(58) Field of Classification Search
CPC .. C08F 6/02; C08F 2/42; C08F 110/14; C08F 10/02; C08F 2/06; C08F 4/6543; C08F 4/6555; C08F 210/16; C08L 23/18
(Continued)

(56) References Cited

U.S. PATENT DOCUMENTS

| 3,819,328 A | 6/1974 | Go |
| 4,105,609 A | 8/1978 | Machon et al. |

(Continued)

FOREIGN PATENT DOCUMENTS

| EP | 0071252 A1 * | 2/1983 |
| JP | 59126409 A | 7/1984 |

(Continued)

OTHER PUBLICATIONS

International Search Report and Written Opinion pertaining to PCT/US2019/023809, dated Jun. 26, 2019.
Third Party Observations pertaining to PCT/US2019/023809, dated Nov. 4, 2019.

*Primary Examiner* — William K Cheung
(74) *Attorney, Agent, or Firm* — Dinsmore & Shohl LLP

(57) ABSTRACT

A solution polymerization process for producing ethylene-based polymer includes introducing ethylene monomer, hydrocarbon solvent, and Ziegler-Natta catalyst into an entrance of a solution polymerization reactor. An ethylene-based polymer is produced by solution polymerizing the ethylene monomer in hydrocarbon solvent. Subsequently, a catalyst deactivator is introduced into x the exit of the solution polymerization reactor, thereby producing hydrochloric acid byproduct. The catalyst deactivator includes long chain carboxylate and at least one cation selected from (Continued)

Groups 1, 2, and 12 of the IUPAC periodic table, with the exception of calcium. The catalyst deactivator reduces the effectiveness of the Ziegler-Natta catalyst and neutralizes the hydrochloric acid by forming a chloride salt other than calcium chloride.

11 Claims, 7 Drawing Sheets

(51) Int. Cl.
    *C08F 6/02*     (2006.01)
    *C08F 2/42*     (2006.01)
    *C08F 110/14*     (2006.01)

(58) Field of Classification Search
    USPC .......................................................... 526/84
    See application file for complete search history.

(56) References Cited

U.S. PATENT DOCUMENTS

| | | |
|---|---|---|
| 4,314,912 A | 2/1982 | Lowery et al. |
| 4,430,488 A | 2/1984 | Zboril |
| 4,547,475 A | 10/1985 | Glass et al. |
| 4,612,300 A | 9/1986 | Coleman |
| 7,332,070 B2 | 2/2008 | Nishida et al. |
| 2009/0062465 A1 | 3/2009 | Cheluget et al. |
| 2013/0149657 A1 | 6/2013 | Hocking et al. |

FOREIGN PATENT DOCUMENTS

| | | | |
|---|---|---|---|
| JP | 60004509 | * | 1/1985 |
| JP | 60004509 A | | 1/1985 |

* cited by examiner

US 11,236,182 B2

ZIEGLER-NATTA CATALYST DEACTIVATION AND NEUTRALIZATION

CROSS-REFERENCE TO RELATED APPLICATIONS

This application is a National Stage Entry under 35 U.S.C. § 371 of International Patent Application No. PCT/US2019/023809, filed Mar. 25, 2019, which claims priority to U.S. Provisional Patent Application Ser. No. 62/649,205 filed Mar. 28, 2018, both of which are incorporated herein by reference in their entireties.

TECHNICAL FIELD

Embodiments of the present disclosure generally relate to the deactivation and neutralization of Ziegler-Natta catalysts. More specifically, embodiments of the present disclosure relate to Ziegler-Natta catalyst deactivation and neutralization in solution polymerization processes for producing ethylene-based polymer.

BACKGROUND

Ethylene-based polymer is one of the most common plastics and may be used in a variety ways depending on the structure of the polymer, for example, bags/liners, caps/closures, hygiene films, industrial injection molding, etc. It has been estimated that approximately 80 million tons of ethylene-based polymer is produced each year. In order to meet demand and efficiently produce ethylene-based polymer, new processes and systems for forming ethylene-based polymer are desired.

Ziegler-Natta catalysts have been used to form ethylene-based polymer. At the end of the reaction, the catalyst must be deactivated to prevent continuation of polymerization outside the controlled reactor environment. Accordingly, catalyst kill components can be added to the reaction to stop the polymerization and neutralize the hydrochloric acid formed from catalyst deactivation. However, using catalyst kill components can cause other problems within the polymerization reaction system. Accordingly, improved processes for producing ethylene-based polymer, including processes that utilize Ziegler-Natta catalyst, are desirable.

SUMMARY

According to at least one embodiment, a solution polymerization process for producing ethylene-based polymer comprises: introducing ethylene monomer, hydrocarbon solvent, and Ziegler-Natta catalyst into an entrance of a solution polymerization reactor; producing the ethylene-based polymer by solution polymerizing the ethylene monomer and the hydrocarbon solvent in the solution polymerization reactor using the Ziegler-Natta catalyst; introducing catalyst deactivator to the solution polymerization reactor, thereby producing hydrochloric acid byproduct. The catalyst deactivator comprises: long chain carboxylate and at least one cation selected from Groups 1, 2, and 12 of the IUPAC periodic table, with the exception of calcium. The catalyst deactivator reduces the effectiveness of the Ziegler-Natta catalyst and neutralizes the hydrochloric acid by forming a chloride salt other than calcium chloride.

According to some embodiments, the cation is selected from Groups 1, 2, and 12 of the IUPAC periodic table, with the exception of calcium.

According to some embodiments, at least one of an additional olefin comonomer and a co-catalyst is introduced into the entrance of the solution polymerization reactor with the ethylene monomer, hydrocarbon solvent, and Ziegler-Natta catalyst.

According to one or more embodiments, the catalyst deactivator is introduced into the solution polymerization reactor near an exit of the solution polymerization reactor.

Additional features and advantages will be set forth in the detailed description which follows, and in part will be readily apparent to those skilled in the art from that description or recognized by practicing the embodiments described herein, including the detailed description which follows, the claims, as well as the appended drawings.

It is to be understood that both the foregoing general description and the following detailed description describe various embodiments and are intended to provide an overview or framework for understanding the nature and character of the claimed subject matter. The accompanying drawings are included to provide a further understanding of the various embodiments, and are incorporated into and constitute a part of this specification. The drawings illustrate the various embodiments described herein, and together with the description serve to explain the principles and operations of the claimed subject matter.

BRIEF DESCRIPTION OF THE DRAWINGS

The following detailed description of specific embodiments of the present disclosure can be understood when read in conjunction with the drawings enclosed herewith.

DETAILED DESCRIPTION

The term "polymer" refers to a polymeric compound prepared by polymerizing monomers, whether of the same or a different type. The generic term polymer thus embraces the term "homopolymer," usually employed to refer to polymers prepared from only one type of monomer as well as "copolymer" which refers to polymers prepared from two or more different monomers.

"Ethylene-based polymer" shall mean polymers comprising greater than 50% by weight of units which have been derived from ethylene monomer. This includes polyethylene homopolymers or copolymers (meaning units derived from two or more comonomers). Common forms of ethylene-based polymer known in the art include Low Density Polyethylene (LDPE); Linear Low Density Polyethylene (LLDPE); Ultra Low Density Polyethylene (ULDPE); Very Low Density Polyethylene (VLDPE); single-site catalyzed Linear Low Density Polyethylene, including both linear and substantially linear low density resins (m-LLDPE); Medium Density Polyethylene (MDPE); and High Density Polyethylene (HDPE).

As used herein, the "solution polymerization reactor" is a vessel, which performs solution polymerization, wherein ethylene monomer, optionally with a comonomer, polymerizes or copolymerizes after being dissolved in a non-reactive solvent that contains a catalyst. Heat may be removed or added to the solution polymerization reactors and after typically coupled to heat exchangers. In the solution polymerization process, hydrogen may be utilized; however, it is not required in all solution polymerization processes.

A conventional process for producing ethylene-based polymers includes a solution polymerization using one or more Ziegler-Natta catalysts to promote the polymerization of ethylene monomers and, optionally, other comonomers. To efficiently quench the catalyst, processes disclosed herein include introducing a catalyst deactivator near the exit of the polymerization reactor that neutralize the effectiveness of the Ziegler-Natta catalyst, thereby controlling the extent of polymerization.

Generally, calcium stearate ($C_{36}H_{70}CaO_4$) has been used in the solution process for ethylene-based polymer production as a Ziegler-Natta catalyst deactivator. When introduced into the polymerization reactor, it deactivates the Ziegler-Natta catalyst, but hydrolysis reactions occur that form hydrochloric acid (HCl). However, the calcium stearate also reacts with (i.e. neutralizes) the HCl that has been generated from hydrolysis reactions and forms calcium chloride ($CaCl_2$) and stearic acid. Unfortunately, the $CaCl_2$ byproduct formed from this neutralization can lead to fouling of downstream equipment, such as, for example, a post reactor heater, by depositing on the walls of the downstream equipment. Accordingly, embodiments of the present disclosure describe the use of compounds capable of deactivating the Ziegler-Natta catalyst, neutralizing any HCl formed from hydrolysis, and do not form $CaCl_2$ byproducts.

Figure 1:
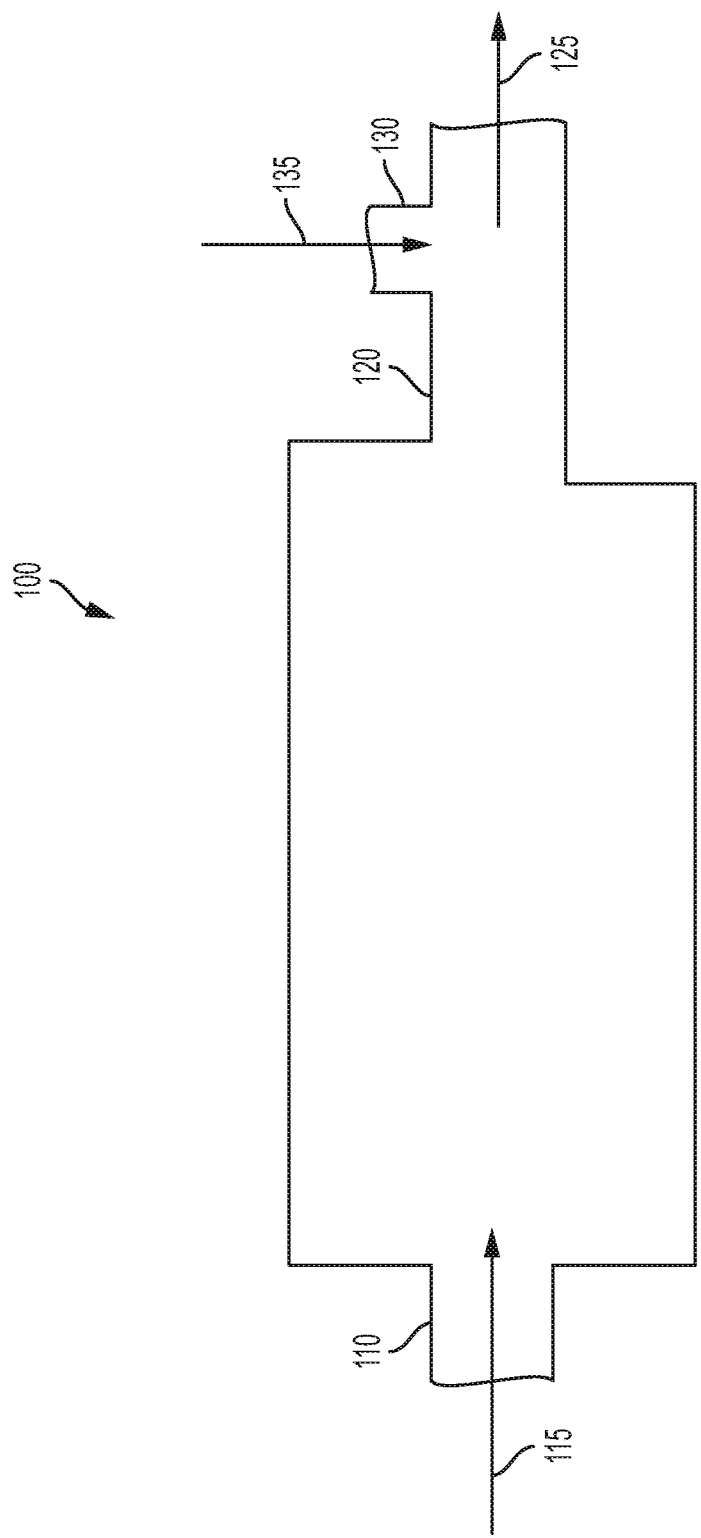
FIG. 1 is a schematic depiction of a solution polymerization reactor according to one or more embodiments disclosed and described herein.

Solution polymerization processes according to embodiments that use catalyst deactivators that achieve the previously-described aspects are described herein below. With reference to FIG. 1, a solution polymerization reactor 100 according to embodiments comprises an entrance 110, an exit 120, and channel 130 for introducing a catalyst deactivator into the solution polymerization reactor 100. The type of solution polymerization reactor used in embodiments is not particularly limited and conventional solution polymerization reactors may be used.

Ethylene monomer, hydrocarbon solvent, and Ziegler-Natta catalyst are introduced at the entrance 110 of the solution polymerization reactor 100. In some embodiments, an additional olefin comonomer is introduced at the entrance 110 of the solution polymerization reactor 100. Also, in one or more embodiments, a catalyst activator, such as, for example, alkylaluminum, is introduced into the polymerization reaction 100. In FIG. 1, stream 115 represents the introduction of these components into the solution polymerization reactor 100. In some embodiments, the ethylene monomer, hydrocarbon solvent, Ziegler-Natta catalyst, and optional additional olefin comonomer may be mixed together to form a feed stream mixture prior to being introduced into the solution polymerization reactor 100, and then the feed stream mixture is introduced into the solution polymerization reactor 100 in a single stream 115 as shown in FIG. 1. However, it should be understood that in other embodiments the ethylene monomer, hydrocarbon solvent, Ziegler-Natta catalyst, and optional additional olefin comonomer can be introduced into the solution polymerization reactor 100 through the entrance 110 as separate streams, even though such an embodiment is not depicted in FIG. 1. It should also be understood that although FIG. 1 depicts the entrance 110 of the solution polymerization reactor 100 as a single channel or opening, in embodiments, the entrance 110 of the solution polymerization reactor 100 may be multiple channels or openings—such as, for example, a channel or opening (not shown) for each component that is being introduced into the solution polymerization reactor 100—that are all positioned in close proximity to one another, such as, for example, on the same wall or surface of the solution polymerization reactor 100. In some embodiments, the Ziegler-Natta catalyst is added in a separate stream from the ethylene monomer and hydrocarbon solvent. Also, in one or more embodiments, a catalyst activator, such as, for example, alkylaluminum, is introduced into the polymerization reaction 100. It should be understood that the catalyst activator may be introduced at any time either before or after the Ziegler-Natta catalyst is added to the polymerization reactor, and the catalyst activator may be added by a separate opening or channel from the Ziegler-Natta catalyst.

Various vessels are contemplated for use as the solution polymerization reactor 100. In one or more embodiments, the solution polymerization reactor 100 may comprise a static mixer, a mechanical mixer, or a continuous stirred tank reactor (CSTR). In a specific embodiment, the solution polymerization reactor 100 may be a continuous stirred tank reactor (CSTR). In other embodiments, the solution polymerization reactor 100 may be a conventional reactor such as a loop reactor, a spherical reactor, an isothermal reactor, a stirred tank reactor, or a batch reactor.

In embodiments that comprise a loop reactor, the loop reactor may comprise one or more heat exchangers (not shown) and, optionally, pipes connecting them to each other and/or to the remainder of the reactor, according to some embodiments. A flow loop may be configured, in some embodiments, with or without interconnecting pipes between components. In some embodiments, it may be desirable to configure every element along the flow path to act as a reaction zone. In such embodiments, the regions where heat transfer takes place may be maximized at the expense of connecting pipes where the transfer is minimal or non-existent. A heat exchanger may comprise, in some embodiments, at least one cooling fluid inlet and at least one cooling fluid outlet. According to some embodiments, a heat exchanger may further comprise at least one reaction stream inlet and at least one reaction stream outlet. In some embodiments, any heat exchange apparatus may be used, in any configuration. For example, a heat exchanger may include a cooling coil positioned in a flow loop. In another example, a heat exchanger may include a shell-and-tube heat exchanger positioned in a flow loop wherein the flow stream passes through the tubes. In another example, an entire flow loop may be configured as a heat exchanger by enclosing it in a cooling jacket or double piping.

It should be understood that although FIG. 1 shows a single solution polymerization reactor 100 with a single reaction zone, embodiments may include a solution polymerization reactor with numerous reaction zones or multiple solution polymerization reactors connected in series or parallel via conventional process methods and connections.

The types of components that are introduced into the solution polymerization reactor 100 at the entrance 110, which include ethylene monomer, hydrocarbon solvent, Ziegler-Natta catalyst, hydrogen gas, and optional additional olefin comonomer, are not particularly limited and components conventionally used in solution polymerization processes for producing ethylene-based polymers may be used in embodiments without limitation.

However, in some embodiments the ethylene monomer that is introduced into the solution polymerization reactor 100 through the entrance 110 may comprise, consist essentially of, or consist of ethylene gas.

Similarly, in one or more embodiments, the hydrocarbon solvent that is introduced into the solution polymerization reactor 100 through the entrance 110 may comprise, consist essentially of, or consist of $C_6$ to $C_{12}$ olefins, $C_6$ to $C_{12}$ paraffins, Isopar-E (manufactured by Exxon Mobil Chemical Company), and mixtures thereof. In other embodiments, various hydrocarbon solvents are considered suitable for use in the solution polymerization reactor. The solvents may vary based on the catalyst used in the solution polymerization reactor. In embodiments, the hydrocarbon solvent may include, for example, one or more of paraffinic/isoparaffinic solvents, olefinic solvents, aromatic solvents, cyclic solvents, and combinations thereof. Examples of solvents may include, without limitation, aliphatic and aromatic hydrocarbons (e.g., toluene, butane, pentane, hexane, cyclohexane, heptane, octane, isooctane, nonane, decane, dodecane and mixtures thereof) and/or ethers (e.g., tetrahydrofuran).

The Ziegler-Natta catalyst that is introduced into the solution polymerization reactor 100 through the entrance 110 is a typical Ziegler-Natta catalyst that is particularly useful at the high polymerization temperatures of the solution polymerization process. Examples of such Ziegler-Natta catalysts are those derived from: organomagnesium compounds; alkyl halides, aluminum halides, or hydrogen chloride; and a transition metal compound. Examples of such Ziegler-Natta catalysts are described in U.S. Pat. Nos. 4,314,912, 4,547,475, and 4,612,300, the entirety of which are incorporated herein by reference.

In one or more embodiments, the Ziegler-Natta catalyst that is introduced into the solution polymerization reactor 100 through the entrance 110 may, comprise, consist essentially of, or consist of $MgCl_2$-supported transition metal catalyst, where the transition metal is selected from the group consisting of titanium (Ti), zirconium (Zr), vanadium (V), and hafnium (Hf). The amount of the Ziegler-Natta catalyst that is introduced into the polymerization reactor may be measured as a ratio of the transition metal in the Ziegler-Natta catalyst to the amount of $C_2$ monomer in the feed stream. The Ziegler-Natta catalyst may be added, in one or more embodiments, in an amount from 0.5 ppm to 20.0 ppm transition metal relative to $C_2$ monomer, such as from 1.0 ppm to 19.0 ppm transition metal relative to $C_2$ monomer, from 2.0 ppm to 18.0 ppm transition metal relative to $C_2$ monomer, from 4.0 ppm to 16.0 ppm transition metal relative to $C_2$ monomer, from 6.0 ppm to 14.0 ppm transition metal relative to 1 ppm $C_2$ monomer, from 8.0 ppm to 12.0 ppm transition metal relative to $C_2$ monomer, or from 9.0 ppm to 11.0 ppm transition metal relative to $C_2$ monomer.

As disclosed previously, an additional α-olefin comonomer may also be introduced into the solution polymerization reactor 100. In some embodiments, the olefin comonomer is selected from the group consisting of propene, butene, pentene, hexene, pentene, octene, nonene, decene, undecene, dodecene, and combinations thereof. In specific embodiments, the olefin comonomer is octene.

In one or more embodiments, a co-catalyst may also be added to the solution polymerization reactor 100 in addition to the Ziegler-Natta catalyst described above. This co-catalyst is not particularly limited and can be an additional Ziegler-Natta catalyst, or a catalyst that drives a reaction other than the polymerization of ethylene monomer. In one or more embodiments, the co-catalyst may be a multi-site titanium-containing catalyst, such as, for example titanium tetrachloride, or a trialkylaluminum species, such as, for example triethylaluminum.

As discussed above, the ethylene monomer polymerizes in the presence of the Ziegler-Natta catalyst and the hydrocarbon solvent via a conventional Ziegler-Natta solution polymerization process to form an ethylene-based polymer. This polymerization reaction is exothermic and can proceed at such a rate that if left unchecked undesirable polymers may be formed, and the temperature inside the solution polymerization reactor can increase to dangerous levels. Accordingly, embodiments of method for solution polymerization processes disclosed and described herein comprise introducing a catalyst deactivator into the solution polymerization reactor to control the polymerization reaction.

With reference again to FIG. 1, catalyst deactivator 135 is introduced into the solution polymerization reactor 100 via a channel 130 that is positioned near an exit 120 of the solution polymerization reactor 100. A product stream 125 comprising the ethylene-based polymer exits the solution polymerization reactor 100 at the exit 120 of the solution polymerization reactor 100. The catalyst deactivator 135 and reaction products formed during neutralization stays in the polymer phase during the deactivation of the Ziegler-Natta catalyst so that it does not enter into a recycle solvent stream (not shown) that would result in Ziegler-Natta catalyst poisoning in the solution reactor. Once introduced into the solution polymerization reactor 100, the catalyst deactivator 135 reduces the activity of the Ziegler-Natta catalyst, thereby controlling the polymerization of the ethylene monomer. However, the catalyst also undergoes hydrolysis during the deactivation of the Ziegler-Natta catalyst thereby forming HCl, which can negatively impact the reactions occurring within the solution polymerization reactor 100 as well as cause damage to the solution polymerization reactor 100 and downstream equipment. Accordingly, in addition to deactivating the Ziegler-Natta catalyst, according to embodiments the catalyst deactivator 135 performs a second function; neutralizing the HCl formed during hydrolysis.

As discussed above, calcium stearate has conventionally been used as a catalyst deactivator in Ziegler-Natta solution polymerization processes because it deactivates the Ziegler-Natta catalyst and neutralizes the HCl formed during hydrolysis. However, the byproduct formed during the neutralization is $CaCl_2$, which can cause fouling of downstream equipment, such as by depositing on the walls of said equipment. Catalyst deactivators used in processes for solution polymerization of ethylene-based polymers according to embodiments disclosed and described herein perform the function of the conventionally-used calcium stearate without forming a byproduct that causes fouling like $CaCl_2$.

In one or more embodiments, the catalyst deactivator 135 comprises: a long chain carboxylate and at least one cation selected from Groups 1, 2, and 12 of the International Union of Pure and Applied Chemistry (IUPAC) periodic table, with the exception of calcium.

In embodiments where the catalyst deactivator comprises a long chain carboxylate and at least one cation selected from Groups 1, 2, and 12 of the IUPAC periodic table, the long chain carboxylate may comprise from greater than or equal to 6 carbon atoms to less than or equal to 40 carbon atoms, such as from greater than or equal to 10 carbon atoms to less than or equal to 30 carbon atoms, or from greater than or equal to 12 carbon atoms to less than or equal to 22 carbon atoms. The long chain carboxylate can, in various embodiments, be saturated or unsaturated. As used herein the term "saturated" means lacking carbon-carbon double bonds, carbon-carbon triple bonds, and heteroatom-containing groups) carbon-nitrogen, carbon-phosphorous, and carbon-silicon double bonds. Likewise, the term "unsaturated" means containing one or more carbon-carbon double bonds, carbon-carbon triple bonds, and (in heteroatom-containing groups) carbon-nitrogen, carbon-phosphorous, and carbon-silicon double bonds, not including any such double bonds that may be present in substituents $R^S$, if any, or in (hetero) aromatic rings, if any. In one or more embodiments, the long chain carboxylate comprises laurate ($C_{12}$), stearate ($C_{18}$), oleate ($C_{18}$ unsaturated), and behenate ($C_{22}$).

In embodiments, the catalyst deactivator 135 also includes a cation in combination with the long chain carboxylate. In embodiments, the cation may be selected from Group 1, 2, and 12 of the IUPAC periodic table, with the exception of calcium. In some embodiments, the cation may be selected from Group 1, 2, and 12 of the IUPAC periodic table with the exception of calcium and zinc. In still other embodiments, the cation is selected from the group consisting of sodium, magnesium, and zinc. In other embodiments, the cation is selected from the group consisting of sodium and magnesium.

In embodiments, the catalyst deactivator 135 may have the following Formula (1):

$$M[RCOO]_x \qquad (1)$$

Where M is selected from sodium, zinc, and magnesium, R is selected from stearyl ($C_{17}H_{35}$) and oleyl ($C_{17}H_{33}$), and x is 1 or 2. In particular embodiments, the catalyst deactivator is selected from the group consisting of sodium oleate, sodium stearate, zinc stearate, or magnesium stearate.

Without being bound by any particular theory, a catalyst deactivator comprising a long chain carboxylate and a cation selected from Group 1, 2, and 12 of the IUPAC periodic table neutralizes the HCl formed during deactivation of the Ziegler-Natta catalyst by disassociating the cation from the long chain carboxylate and forming a chloride salt. These neutralization reactions of HCl occur more rapidly compared to neutralization of HCl when a conventional calcium stearate is used as the catalyst deactivator.

As used herein, the neutralization of the HCl is determined to occur when the pH of the solution within the solution polymerization reactor has a pH of from greater than or equal to 6.0 to less than or equal to 8.0, such as from greater than or equal to 6.5 to less than or equal to 7.5, or about 7.0. As noted above, using catalyst deactivators according to embodiments disclosed and described herein provides more rapid neutralization of HCl than conventional calcium stearate. For instance, when 2.5 equivalents of calcium stearate are added to a solution having a pH of 4.0, it takes about 24 hours for the calcium stearate to neutralize the HCl. In contrast it takes only about 8 hours for the same amount, or less, of zinc stearate, magnesium stearate, and sodium stearate to neutralize the HCl of the same solution. In addition, it only takes about 1 hour for sodium oleate to neutralize the HCl of the same solution. Thus, there is a marked decrease in the time it takes to neutralize the HCl when catalyst deactivators according to embodiment disclosed and described herein are used.

The catalyst deactivator 135 may, in one or more embodiments, be added to the solution polymerization reactor in an amount relative to the amount of free chloride ions that may be formed during deactivation of the Ziegler-Natta catalyst.

For example, in a Ziegler-Natta catalyst that comprises a metal chloride support, it has been determined that the chloride present in the metal chloride support does not hydrolyze at relevant process temperatures, such as, for example, from 130° C. to 270° C., from 150° C. to 250° C., or from 175° C. to 225° C. Therefore the free chloride ions will be formed from other chloride-containing components of the Ziegler-Natta catalyst (i.e., components other than the metal chloride support). Once the amount of free chloride ions is determined, an amount of catalyst deactivator may be selected based on the amount of free chloride ions as measured by equivalents. One equivalent of catalyst deactivator has a stoichiometric balance between the amount of free chloride ions present in the Ziegler-Natta catalyst and the amount of neutralizing components (such as, for example, a cation) in the catalyst deactivator. As a non-limiting example, where the Ziegler-Natta catalyst comprises a chloride molecule and the catalyst deactivator comprises a compound of the formula $M[RCOO]_x$ where x=1, then one equivalent of the catalyst deactivator to the Ziegler-Natta catalyst is one mole of the catalyst deactivator, and two equivalents of the catalyst deactivator is two moles of the catalyst deactivator. However, where the Ziegler-Natta catalyst comprises a compound of the formula $M[RCOO]_x$ where x=2, then one equivalent of the catalyst deactivator to the Ziegler-Natta catalyst is two moles of the catalyst deactivator, and two equivalents of the catalyst deactivator is four moles of the catalyst deactivator.

In embodiments, the catalyst deactivator 135 may be added to the solution polymerization reactor in an amount from greater than or equal to 0.2 equivalents to less than 8.0 equivalents, such as from greater than or equal to 0.5 equivalents to less than or equal to 7.5 equivalents, from greater than or equal to 1.0 equivalents to less than or equal to 7.0 equivalents, from greater than or equal to 1.5 equivalents to less than or equal to 6.0 equivalents, from greater than or equal to 2.0 equivalents to less than or equal to 5.0 equivalents from greater than or equal to 2.0 equivalents to less than or equal to 3.0 equivalents, or about 2.5 equivalents. Equivalents are defined relative to amount of free chloride. Thus, in embodiments, the equivalents is in respect to carboxylates, so in the formula $M[RCOO]_x$, the equivalents is defined as x.

In addition to more rapidly neutralizing HCl formed during deactivation of the Ziegler-Natta catalyst, processes using the catalyst deactivators disclosed and described herein is also capable of deactivating the Ziegler-Natta catalyst using less equivalents of the catalyst deactivator than the conventional calcium stearate. For instance, and as an example, 8 to 16 equivalents of calcium stearate are required to deactivate the catalyst, which is represented by a temperature within the solution polymerization reactor at 50° C. or below for at least 8 minutes. However, the same temperature can be maintained within the solution polymerization reactor for over 8 minutes with only 4 or less equivalents of the catalyst deactivator according to embodiments disclosed and described herein. This is a marked improvement over the conventional catalyst deactivator.

As also mentioned above the conventional calcium stearate catalyst deactivator forms a $CaCl_2$ byproduct as a result of the reaction with HCl. The $CaCl_2$ byproduct can foul downstream equipment, such as by depositing on the walls to the downstream equipment. This is evidenced by the precipitation of $CaCl_2$ in downstream equipment. However, using a catalyst deactivator according to embodiments disclosed and described herein, such precipitates are not formed and fouling of downstream equipment can be mitigated.

EXAMPLES

Embodiments will be further clarified by the following examples.

Example 1 and Comparative Example 1: Catalyst Deactivation Based on Polyoctene Test The chemical reaction scheme for Example 1 is provided below.

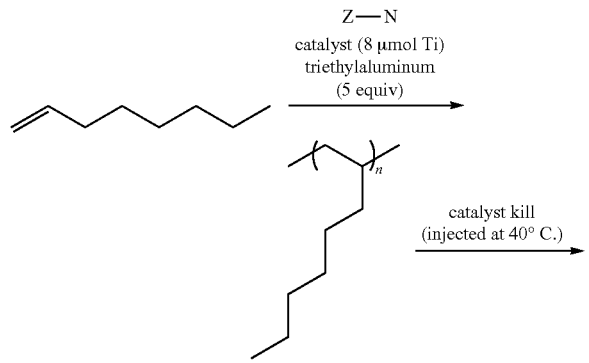

A reaction was performed in an inert atmosphere nitrogen-purged glovebox. In this glovebox, 5.5 mL of 1-octene and 5.5. mL of Isopar-E (manufactured by the Exxon Mobil Chemical Company) were added to four 40 mL glass vials equipped with a magnetic stir bar. The vials were inserted into the insulated slots of a magnetic stirrer block. Thermocouples were inserted through the rubber septum of the vials to begin monitoring the temperature. To the each of the four vials, 40 µL of 1.0 M triethylaluminum in hexanes (5 equiv. with respect to Ti) was added, followed by the addition of an $MgCl_2$-supported Ti-based Ziegler-Natta catalyst solution (8.00 µmol Ti). The vials were immediately sealed with the septum caps and the temperature of the reaction mixture was recorded at five second intervals. When the temperature reached 40° C. (approximately 10° C. exotherm), the catalyst deactivator solutions were injected. Comparative Example 1 included two samples that injected calcium stearate (monohydrate) and dried calcium stearate into two separate vials, and Example 1 included 4 samples that injected sodium oleate, sodium stearate, zinc stearate, and magnesium stearate into 4 separate vials. Effectiveness of the deactivation was determined by curtailing of the temperature rise following injection of the catalyst deactivator. Equivalents in the following plots are with respect to Cl⁻ expected from active chloride content of the Ziegler-Natta catalyst.

Figure 2A:
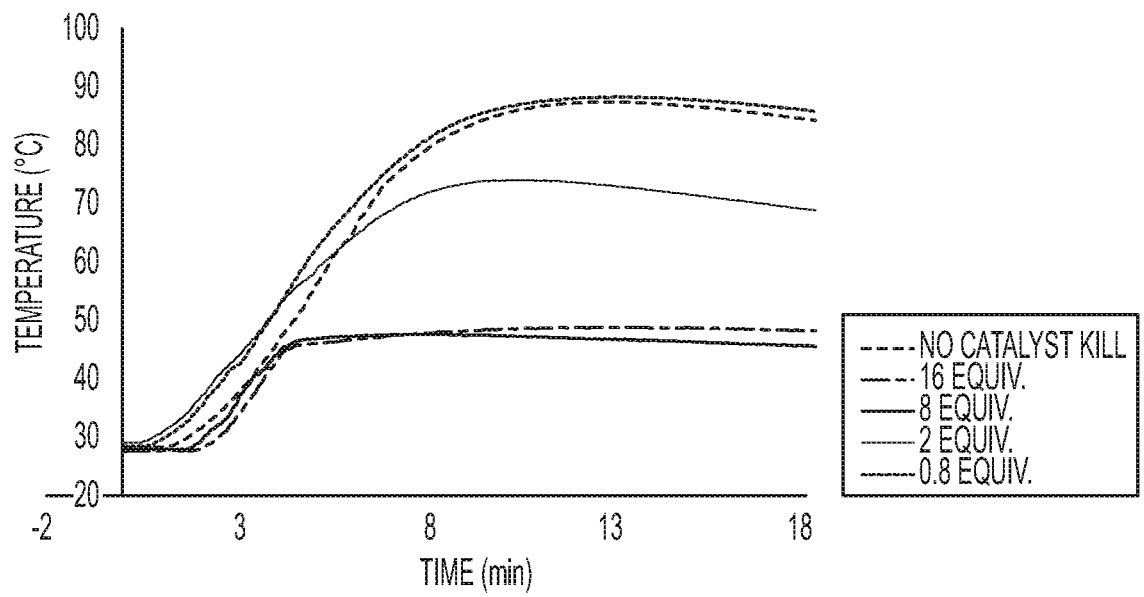
FIGS. 2A and 2B are graphical illustrations of catalyst deactivation provided by methods using calcium stearate.
Figure 2B:
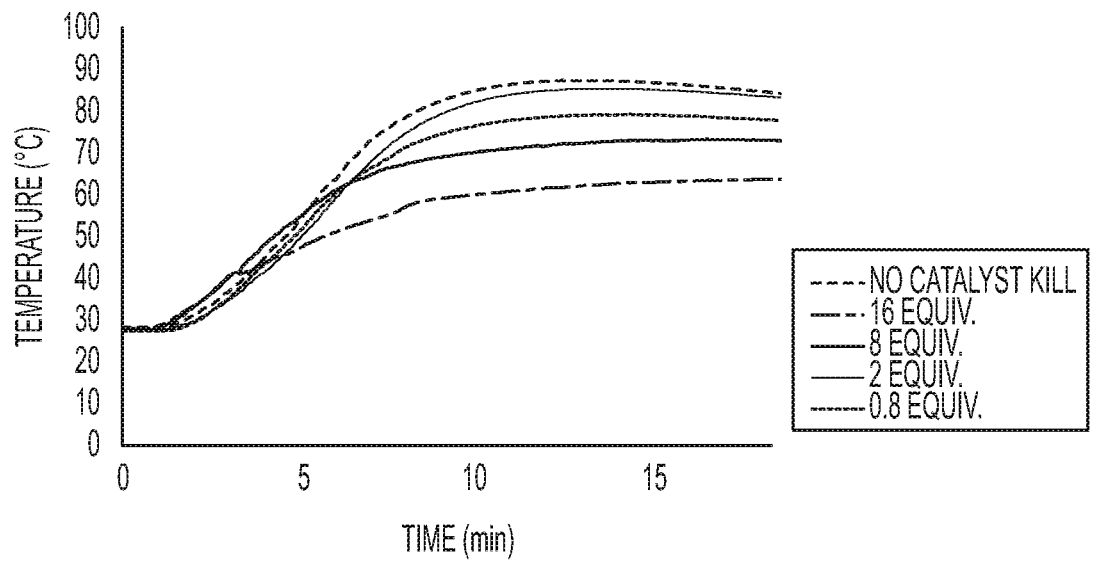
Figure 2C:
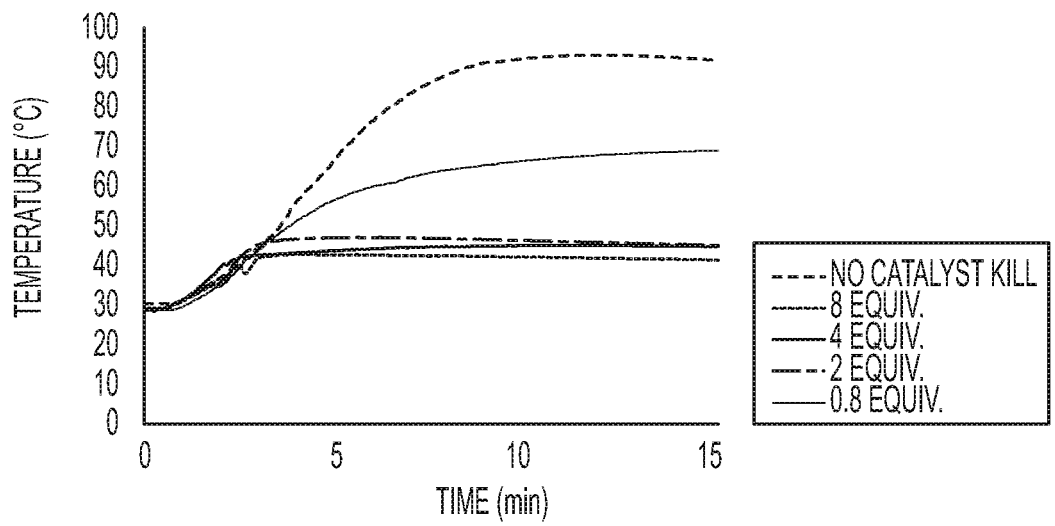
FIGS. 2C-2F are graphical illustrations of exotherm suppression provided by methods according to embodiments disclosed and described herein.
Figure 2D:
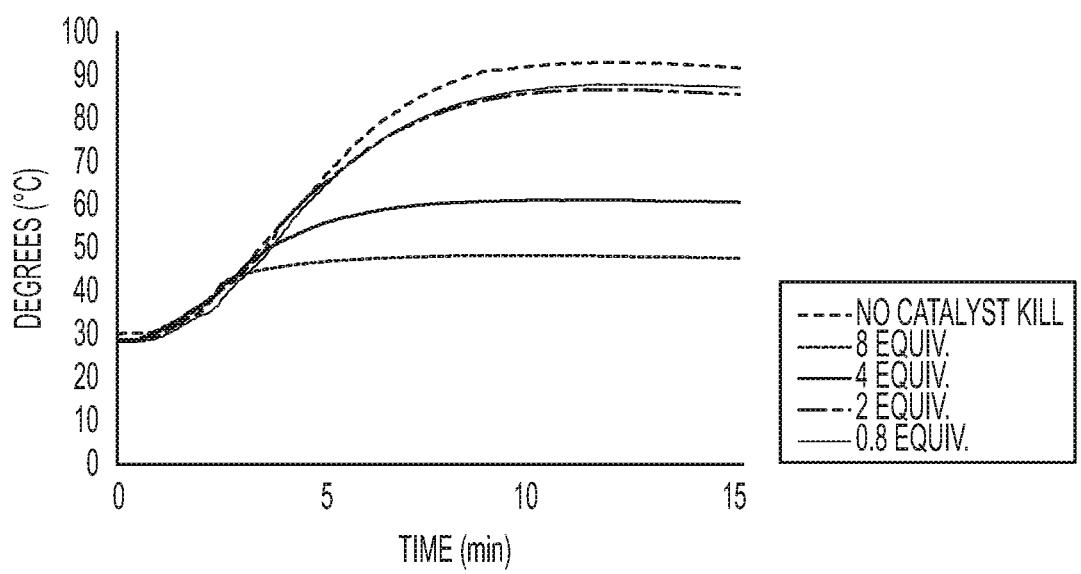
Figure 2E:
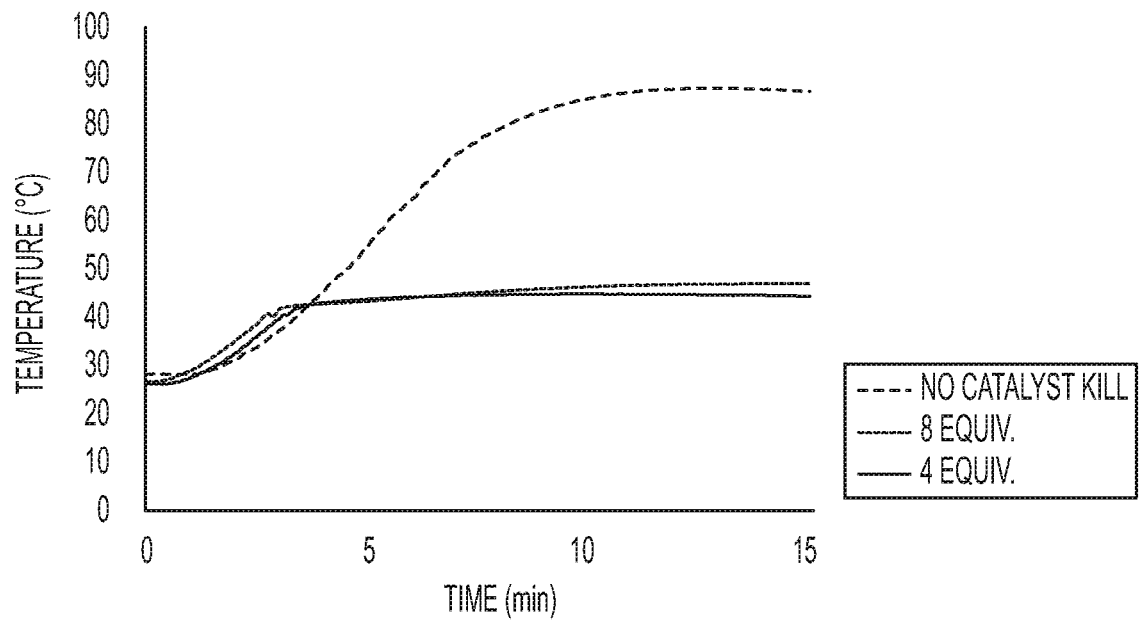
Figure 2F:
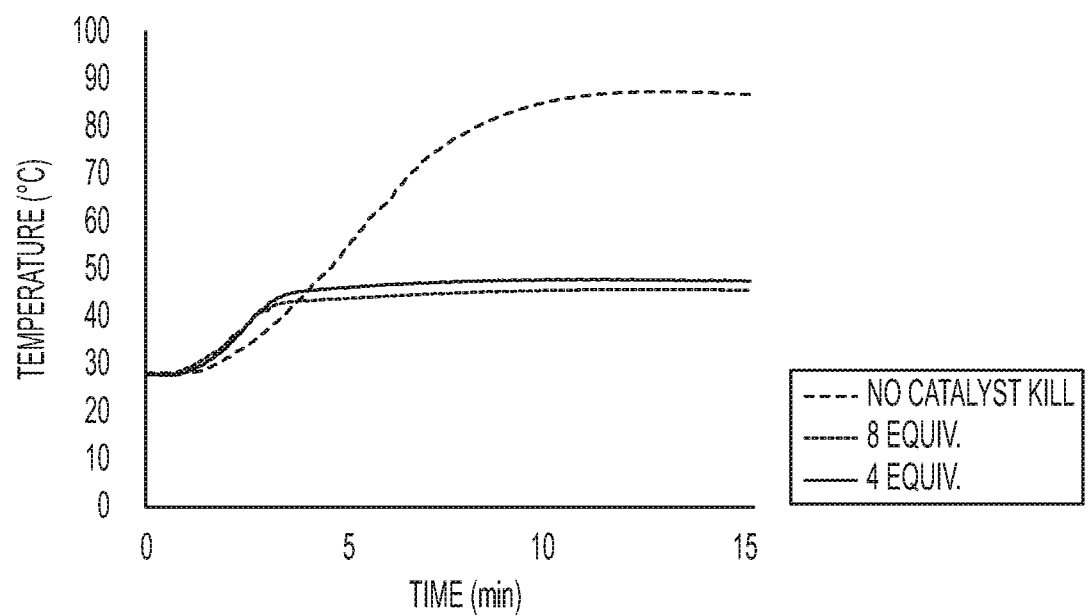

The extent of catalyst deactivation is based upon the suppression of the exotherm that arises during octene polymerization, and is shown in FIGS. 2A-2G. In particular, FIGS. 2A and 2B show the exotherm suppression in degrees Celsius along the y-axis and time in minutes along the x-axis for Comparative Example 1 using calcium stearate (monohydrate) and dried calcium stearate, respectively. FIGS. 2C-2F show the exotherm suppression for Example 1 using sodium oleate, sodium stearate, zinc stearate, and magnesium stearate, respectively, as the catalyst deactivator. As seen in FIGS. 2A-2F, less equivalents of sodium oleate, sodium stearate, and magnesium stearate are required to suppress the exotherm when compared to either calcium stearate (monohydrate) or dried calcium stearate.

Thus, Example 1 shows the marked improvement in catalyst deactivation when using catalyst deactivators according to embodiments disclosed and described herein.

Example 2: Comparison of HCl Neutralization by Different Metal Carboxylates

The chemical reaction scheme for Example 2 is provided below.

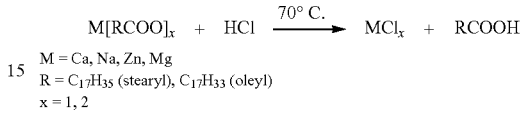

M = Ca, Na, Zn, Mg
R = $C_{17}H_{35}$ (stearyl), $C_{17}H_{33}$ (oleyl)
x = 1, 2

One mL of Ziegler-Natta catalyst slurry solution (0.013 M Ti) and 9 mL Isopar-E was added to a 40 mL vial equipped with a stir bar and quenched with 10 mL of deionized water. After stirring at 70° C. for one hour, both the organic layer and aqueous layer turned clear and colorless. With pH paper, the pH of the aqueous layer was acidic, indicating the presence of HCl from Ziegler-Natta catalyst hydrolysis.

To neutralize the HCl, a solution of the metal carboxylate (0.5, 1.0, 2.0, or 5.0 equivalents with respect to the carboxylate) was injected into the vial and the solution was allowed to stir vigorously at 70° C. for 8 hours while continuously monitoring the pH of the aqueous layer.

When the pH was neutral (by pH paper) or after 8 hours (whichever came first, with the exception of one reaction with 5 equivalents calcium stearate that was allowed to react for 24 hrs), the aqueous layer was collected and the pH was measured with a pH meter. The Cl content was measured by titration against standard $AgNO_3$ solutions using a potassium chromate indicator (Mohr's method) to verify the expected chlorides from $MgCl_2$ and EADC from 1 mL of the Ziegler-Natta catalyst were accounted for. The results are provided below in Table 1.

TABLE 1

| Cat Kill | Time (hr) | pH |
|---|---|---|
| None | 24 | 4 |
| 2.5 equiv. Ca stearate (5 equiv. stearate) | 3 24 | 4 6-7 |
| 2.5 equiv. Zn Stearate (5 equiv. stearate) | 8 | 6-7 |
| 2.5 equiv. Mg Stearate (5 equiv. stearate) | 8 | 7-8 |
| 2 equiv. Na stearate | 8 | 7-8 |
| 2 equiv. Na oleate | 1 | 7-8 |

Figure 3:
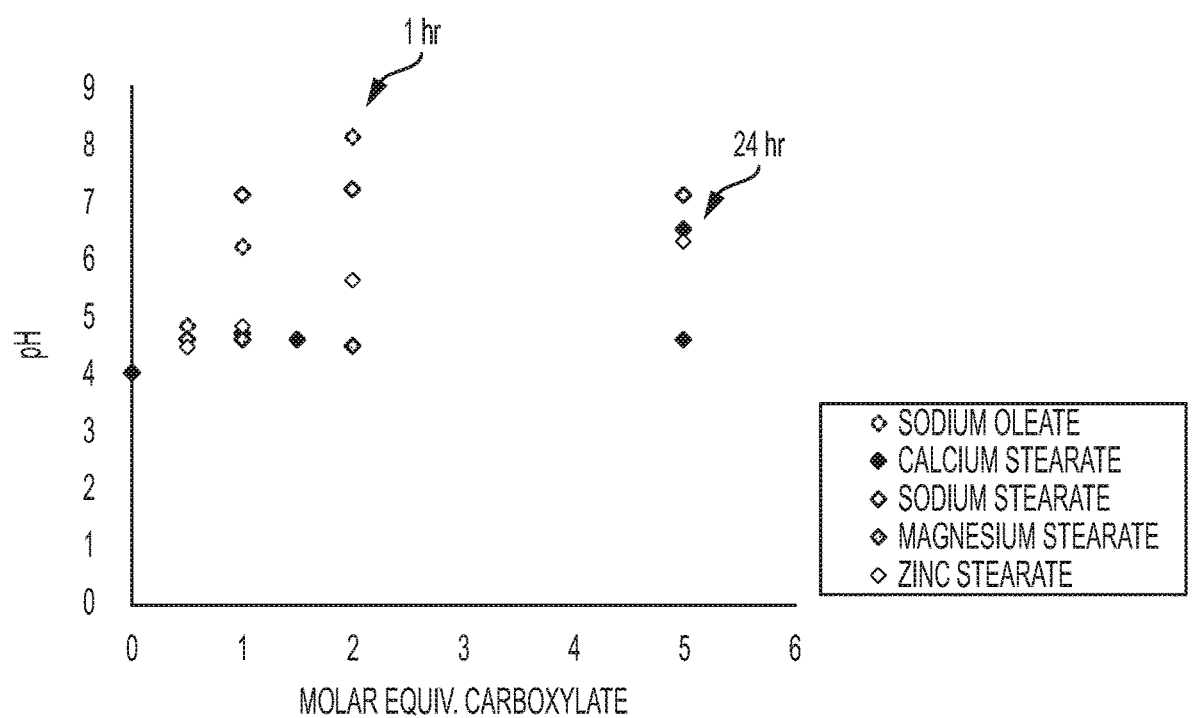
FIG. 3 is a graphical illustration HCl neutralization by methods according to embodiments disclosed and described herein.

The pH data provided above in Table 1 is graphically depicted in FIG. 3. Neutralization of HCl formed by hydrolysis of the Ziegler-Natta catalyst is achieved by 2.5 equivalents of calcium stearate only after 24 hours of reaction at 70° C. Under the same reaction conditions, zinc stearate (2.5 equivalents), magnesium stearate (2.5 equivalents), and sodium stearate (2 equivalents) neutralize HCl after 8 hours. Sodium oleate (2 equivalents) neutralizes HCl after only 1 hour under the same reaction conditions.

Example 3 and Comparative Example 3:
Observation of Precipitation from Heating Z-N
Catalyst and Cat Kill Compounds (with and
without TEA, 190° C.)

Figure 4A:
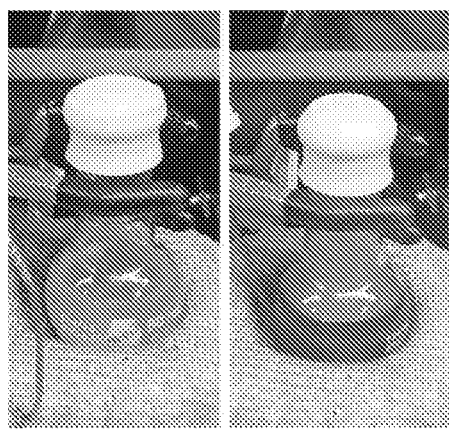
FIGS. 4A and 4B are photographs showing precipitates formed by methods with no catalyst deactivator and with calcium stearate used as the catalyst deactivator.
Figure 4B:
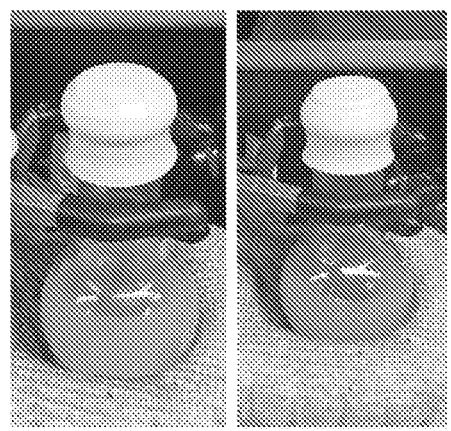
Figure 4C:
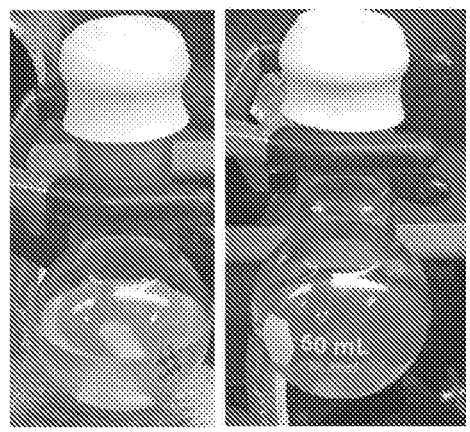
FIGS. 4C-4F are photographs showing precipitates formed by methods according to embodiments disclosed and described herein.
Figure 4D:
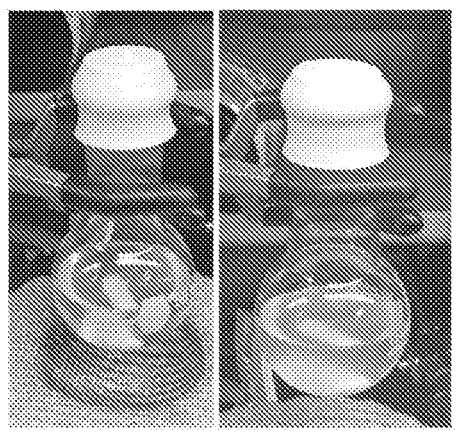
Figure 4E:
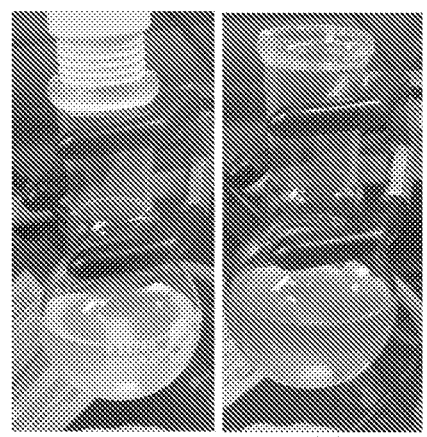
Figure 4F:
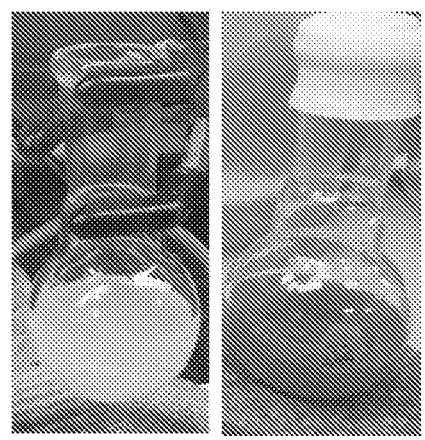

Reactions were performed in a nitrogen-purged inert atmosphere glovebox. To the glovebox, 0.25 M calcium stearate, 0.25 M zinc stearate, and 0.25 M magnesium stearate, 0.5 M sodium stearate, and 0.5 M sodium oleate in Isopar-E were prepared. In a 50 mL round bottom flask. Additionally, 1 mL of HEC-3 catalyst solution (0.013 M Ti) and 20 mL of hexadecane were added. For experiments with triethylaluminum, 5 equivalents of TEA with respect to Ti in HEC-3 was additionally added. The solutions were heated to 190° C., after which 1 mL of the different catalyst deactivator solutions (approximately 250 g catalyst deactivator/g Ti) was added to the flask. Comparative Example 2 included a sample flask with no catalyst deactivator and a flask including calcium stearate as the catalyst deactivator, and Example 3 included 5 flasks including sodium oleate, sodium stearate, zinc stearate, and magnesium stearate as the catalyst deactivator. The solutions were allowed to stir for approximately 1 hour and any precipitation and color changes were observed. FIGS. 4A and 4B are photographs of the solutions of Comparative Example 2 with no catalyst deactivator and calcium stearate, respectively, as the catalyst deactivator. FIGS. 4C-4G are photographs of the solutions of Example 3 using sodium stearate, sodium oleate, magnesium stearate, and zinc stearate, respectively, as the catalyst deactivator. In each of FIGS. 4A-4F, the image on the left does not contain triethylaluminum (TEA) and the image on the right contains 5 equivalents of TEA. As can be seen in FIGS. 4A-4F, the solutions of Comparative Example 2 (FIGS. 4A and 4B) contain more precipitates compared to the solutions of Example 3 (FIGS. 4C-4F). In addition, the zinc stearate catalyst deactivator (FIG. 4F) shows higher amounts of precipitates than the other catalyst deactivators according to Example 3, but does not show as much precipitate as the solutions in Comparative Example 2.

The results are also quantified in Table 2:

TABLE 2

| Catalyst Deactivator | Result at 190° C. (no TEA) | Result at 190° C. (TEA added) | Rank (1 = Best, 5 = worst) |
| --- | --- | --- | --- |
| None | Brown, cloudy slurry with precipitates | Black, cloudy slurry with precipitates | n/a |
| Calcium Stearate | White, cloudy slurry with precipitates | White, cloudy slurry with precipitates | 4 |
| Sodium Stearate | Almost transparent, some precipitate | Brown, cloudy with some precipitates | 2 |
| Sodium Oleate | Clear solution, no precipitates | Off-white, almost clear solution with some precipitate | 1 |
| Magnesium Stearate | Slightly cloudy, some precipitate | Brown, cloudy with some precipitates | 3 |
| Zinc Stearate | White, cloudy slurry with precipitates | Grey, cloudy slurry with precipitates | 4 |

It will be apparent to those skilled in the art that various modifications and variations can be made to the embodiments described herein without departing from the spirit and scope of the claimed subject matter. Thus it is intended that the specification cover the modifications and variations of the various embodiments described herein provided such modification and variations come within the scope of the appended claims and their equivalents.

The invention claimed is:

1. A solution polymerization process for producing ethylene-based polymer comprising:
   introducing ethylene monomer, hydrocarbon solvent, and Ziegler-Natta catalyst into a solution polymerization reactor;
   producing the ethylene-based polymer by solution polymerizing the ethylene monomer and the hydrocarbon solvent in the solution polymerization reactor using the Ziegler-Natta catalyst;
   introducing catalyst deactivator to the solution polymerization reactor, thereby producing hydrochloric acid byproduct,
   wherein the catalyst deactivator comprises:
      long chain carboxylate and at least one cation selected from Groups 1, 2, and 12 of the IUPAC periodic table, with an exception of calcium,
   wherein the catalyst deactivator reduces effectiveness of the Ziegler-Natta catalyst and neutralizes the hydrochloric acid by forming a chloride salt other than calcium chloride,
   wherein the catalyst deactivator is added to the solution polymerization reactor in an amount from greater than or equal to 0.2 molar equivalents to less than 8.0 molar equivalents with respect to the hydrolyzable chlorides, and
   wherein the catalyst deactivator is added to the exit of the solution polymerization reactor when a temperature within the solution polymerization reactor is from greater than or equal to 160° C. to less than or equal to 220° C.

2. The method of claim 1, wherein additional olefin comonomer is introduced into the solution polymerization reactor with at least one of the ethylene monomer, hydrocarbon solvent, and Ziegler-Natta catalyst.

3. The method of claim 2, wherein the additional olefin comonomer is selected from the group consisting of propene, butene, pentene, hexene, pentene, octene, nonene, decene, undecene, dodecene, and combinations thereof.

4. The method of claim 1, wherein the hydrocarbon solvent is selected from the group consisting of $C_6$ to $C_{12}$ olefins, $C_6$ to $C_{12}$ paraffins, and mixtures thereof.

5. The method of claim 1, wherein co-catalyst is introduced into the solution polymerization reactor with at least one of the ethylene monomer, hydrocarbon solvent, and Ziegler-Natta catalyst.

6. The method of claim 1, wherein the Ziegler-Natta catalyst is selected from the group consisting of a $MgCl_2$-supported transition metal catalyst where the transition metal can be selected from Ti, Zr, V, and Hf.

7. The method of claim 1, wherein the catalyst deactivator is introduced into the solution polymerization reactor near an exit of the solution polymerization reactor.

8. The method of claim 1, wherein the at least one cation is selected from Groups 1, 2, and 12 of the IUPAC periodic table, with an exception of calcium.

9. The method of claim 1, wherein the long chain carboxylate comprises from greater than or equal to 6 carbon atoms to less than or equal to 40 carbon atoms.

10. The method of claim 1, wherein the long chain carboxylate comprises from greater than or equal to 12 carbon atoms to less than or equal to 22 carbon atoms.

11. The method of claim 1, wherein the catalyst deactivator has a formula: $M[RCOO]_x$, where M is selected from sodium, zinc, and magnesium, R is selected from stearyl ($C_{17}H_{35}$) and oleyl ($C_{17}H_{33}$), and x is 1 or 2.

\* \* \* \* \*